United States Patent Office 2,970,909
Patented Feb. 7, 1961

2,970,909

DIAZOTYPE MATERIALS CONTAINING COUPLING COMPONENTS FOR HIGH OPACITY ULTRAVIOLET YELLOWS AND VISUALLY DENSE SEPIAS

Chester E. Slimowicz, Binghamton, N.Y., assignor to General Aniline & Film Corporation, New York, N.Y., a corporation of Delaware No Drawing. Filed Feb. 4, 1957, Ser. No. 637,891

4 Claims. (Cl. 96—91)

The present invention relates to diazotype materials which contain coupling components capable of yielding azo dye images which are ultra-violet opaque sepias.

It is known that yellow dyes are the most efficient ultraviolet (hereinafter called UV) absorbers and as such make the best intermediate diazotype prints used as originals for subsequent copies. However, the yellow line is visually weak and tiring. It is, therefore, necessary to compromise the high opacity of a yellow dye with a visually denser brown dye to produce a practical sepia which is sufficiently opaque to UV and visually easier to work with.

Sepias are available through the use of certain coupling components such as resorcinol and its derivative in combination with suitable diazonium compounds employed in the diazotype art. However, although the resorcinols yield visually dense sepias, the UV absorption of the dyes produced therewith leaves much to be desired.

Theoretically, it would appear that if one could take advantage of the high opacity of a suitable yellow dye and render it visually pleasing, the result would be an ideal dye for intermediate prints. It would also appear that this result would be achieved by incorporating with the coupling component for the yellow, a further coupling component which would produce with the diazo used, a visually dense dye and which would shade the visually weak yellow to a visually dense sepia. While this approach is theoretically sound, it has been found exceedingly difficult in practice to select a coupling component possessing the necessary tinctorial strength and a coupling activity similar or equivalent to that of the coupler producing the yellow dye.

Since the given diazo concentration determines the potential amount of dye formed and since both couplers in this theoretical combination are competing for the diazo, it is manifest that a maximum shading effect with a minimum expenditure of the diazo will insure a more optimum production of useful UV opaque dye. It is, therefore, essential to have shaders for the UV absorbing yellow which, in relatively small concentrations, will produce visually intense shades and which, in combination with the yellow, will result in the desired sepia tone. An additional requirement of the shading coupling component is that its coupling activity or speed be equivalent to that of the coupling component for the yellow. Should the shading component fail to measure up in coupling activity to that of the yellow component, the result is an undesirable two-toning effect in the half tones.

It has now been discovered that 1-naphthols containing a sulfamyl group in the 3-position thereof are coupling components which yield visually dense dyes and yet possess coupling activity in keeping with that of the visually weak but highly UV opaque yellow dye producing coupling component. This combination of coupling components results in a visually dense intermediate sepia print having excellent UV opacity. The use of this combination for the production of diazotype materials and particularly intermediate prints, constitutes the purposes and objects of the present invention.

The coupling components contemplated for use herein as shaders are typified by the following structural formula:

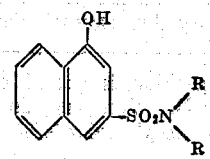

in which R is hydrogen, hydroxyalkyl such as hydroxymethyl, hydroxyethyl, hydroxypropyl or the like; alkyl such as methyl, ethyl, propyl, butyl and the like; aryl such as phenyl, naphthyl and the like; alkylaryl such as ethylphenyl and the like; hydroxyaryl such as hydroxyphenyl or the like; and alkoxyaryl such as methoxyphenyl, ethoxyphenyl and the like.

Examples of compounds in the above classification which I have found to be excellent shading components for high UV opaque yellows to yield visually pleasing sepias are:

3-sulfamyl-1-naphthol
3-(N-β-hydroxyethylsulfamyl)-1-naphthol
3-(N,N-bis-β-hydroxyethylsulfamyl)-1-naphthol
3-(N-phenylsulfamyl)-1-naphthol
3-(N-ethylsulfamyl)-1-naphthol
3-(N-o-tolylsulfamyl)-1-naphthol
3-(N-o-hydroxyphenylsulfamyl)-1-naphthol
3-(N-o-methoxyphenylsulfamyl)-1-naphthol The coupling component used with the above shader is a phenol capable of coupling with a light sensitive diazo compound to yield an absorbent or opaque UV yellow dye. Examples of such compounds are:

2-(N,N'-diethylaminomethyl)-3,6-dimethylphenol
3-acetamidophenol
m-Hydroxyphenylurea
o-Hydroxyphenylurea
3,3'-dihydroxycarbanilide
m,m'-Ethylene dioxydiphenol
m,m'-Trimethylene dioxydiphenol
m,m'-Tetramethylene dioxydiphenol
m,m'-Pentamethylene dioxydiphenol
m,m'-1-methyl trimethylene dioxydiphenol
6,6'-dimethyl-3,3'-trimethylene dioxydiphenol
m,m'-(p-phenylene dimethylene dioxy)diphenol
6,6'-dihexyl-3,3'-isopropilidene dioxydiphenol
4,4'-5,6'-tetramethyl-3,3'-trimethylene dioxydiphenol
Polymers of the aforesaid dioxydiphenols with formaldehyde The diazo component which is utilized in the sensitizing composition is of the type generally employed in the diazotype art, preferably one derived from a p-phenylenediamine. Examples of diazos which I have found to yield excellent results are those derived from p-amino-N-ethyl-o-toluidine; p-amino-N-ethyl-N - hydroxyethylaniline; 4 - p - morpholinylaniline; p-amino-N-cyclohexyl-N-ethylaniline, and the like.

As it is to be expected, the dye shader is used in a relatively smaller amount than the component for the yellow image. Typically, I may use a ratio of the shader to yellow coupling component of 1 part of the former to 3 to 5 parts of the latter.

The invention is illustrated by the following examples, although it is understood that the invention is not restricted thereto.

Example I

| | | |
|---|---|---|
| Water | mls | 60 |
| Glycol | mls | 7 |
| Boric acid | gms | 2 |
| Citric acid | gms | 5 |
| Thiourea | gms | 5 |
| Zinc chloride | gms | 5 |
| o-Hydroxyphenylurea | gms | 3 |
| 3-sulfamyl-1-naphthol | gm | .7 |
| p-(N-ethyl-N-hydroxyethylbenzene)-diazonium chloride | gms | 4.5 |

When this composition is coated on a paper base, dried, exposed to UV light and developed with ammonia vapors, a dark sepia color is obtained.

Example II

The procedure is the same as in Example I excepting that m-hydroxyphenylurea is used in lieu of the o-hydroxyphenylurea.

Example III

The procedure is the same as in Example I excepting that 2-(N,N-diethylaminomethyl)-3,6-dimethylphenol is used in lieu of the m-hydroxyphenylurea.

Example IV

| | | |
|---|---|---|
| Water | mls | 50 |
| Isopropanol | mls | 50 |
| Boric acid | gms | 2 |
| Citric acid | gms | 4 |
| Thiourea | gms | 5 |
| Zinc chloride | gms | 5 |
| 3-sulfamyl-1-naphthol | gm | .7 |
| m-Hydroxyphenylurea | gms | 2.5 |
| p-(N-ethyl-2-methylbenzene)-diazonium chloride | gms | 6.0 |

When coated on polyvinyl base which has been precoated with solution of an alkali soluble resin, dried and exposed to UV light and developed with ammonia vapors, a dark sepia color is obtained.

Example V

The procedure is the same as in Example IV excepting that polystyrene is substituted for the polyvinyl base.

Modifications of the present invention will occur to persons skilled in the art and I, therefore, do not intend to be limited by the patent granted except as necessitated by the appended claims.

I claim:

1. Light-sensitive diazotype materials capable of forming intermediate prints having a high opacity for UV and a high visual density in a dark sepia tone, comprising a translucent base coated with a light-sensitive diazonium compound derived from a p-phenylenediamine and a mixture of coupling components having substantially the same coupling speed, one coupler being a mono-hydric phenol capable of yielding a dye highly absorptive for UV light and essentially yellow in color and the second coupling compound being a 1-hydroxy-3-sulfamylnaphthalene capable of yielding a shading dyestuff, said coupling component being selected from the group of compounds having the following formula:

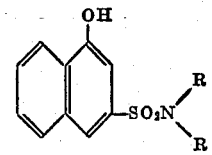

in which R is selected from the class consisting of hydrogen, alkyl, hydroxyalkyl, aryl, alkylaryl, hydroxyaryl and alkoxyaryl.

2. The composition as defined in claim 1 wherein the monohydric phenol contains an amide group.

3. The composition as defined in claim 1 wherein the light-sensitive diazo compound is p-(N-ethyl-N-hydroxyethylbenzene)-diazonium chloride; the yellow coupler is o-hydroxyphenylurea and the sepia shader is 3-sulfamyl-1-naphthol.

4. The composition as defined in claim 1 wherein the two coupling components are present in a ratio of 1 part of 1-hydroxy-3-sulfamylnaphthalene per 3 to 5 parts of monohydric phenol.

References Cited in the file of this patent

UNITED STATES PATENTS

| | | |
|---|---|---|
| 2,037,542 | Schmidt et al. | Apr. 14, 1936 |
| 2,298,444 | Weissberger et al. | Oct. 13, 1942 |
| 2,485,122 | Von Glahn et al. | Oct. 18, 1949 |
| 2,537,098 | Slifkin et al. | Jan. 9, 1951 |
| 2,542,715 | Slifkin | Feb. 20, 1951 |